UNITED STATES PATENT OFFICE.

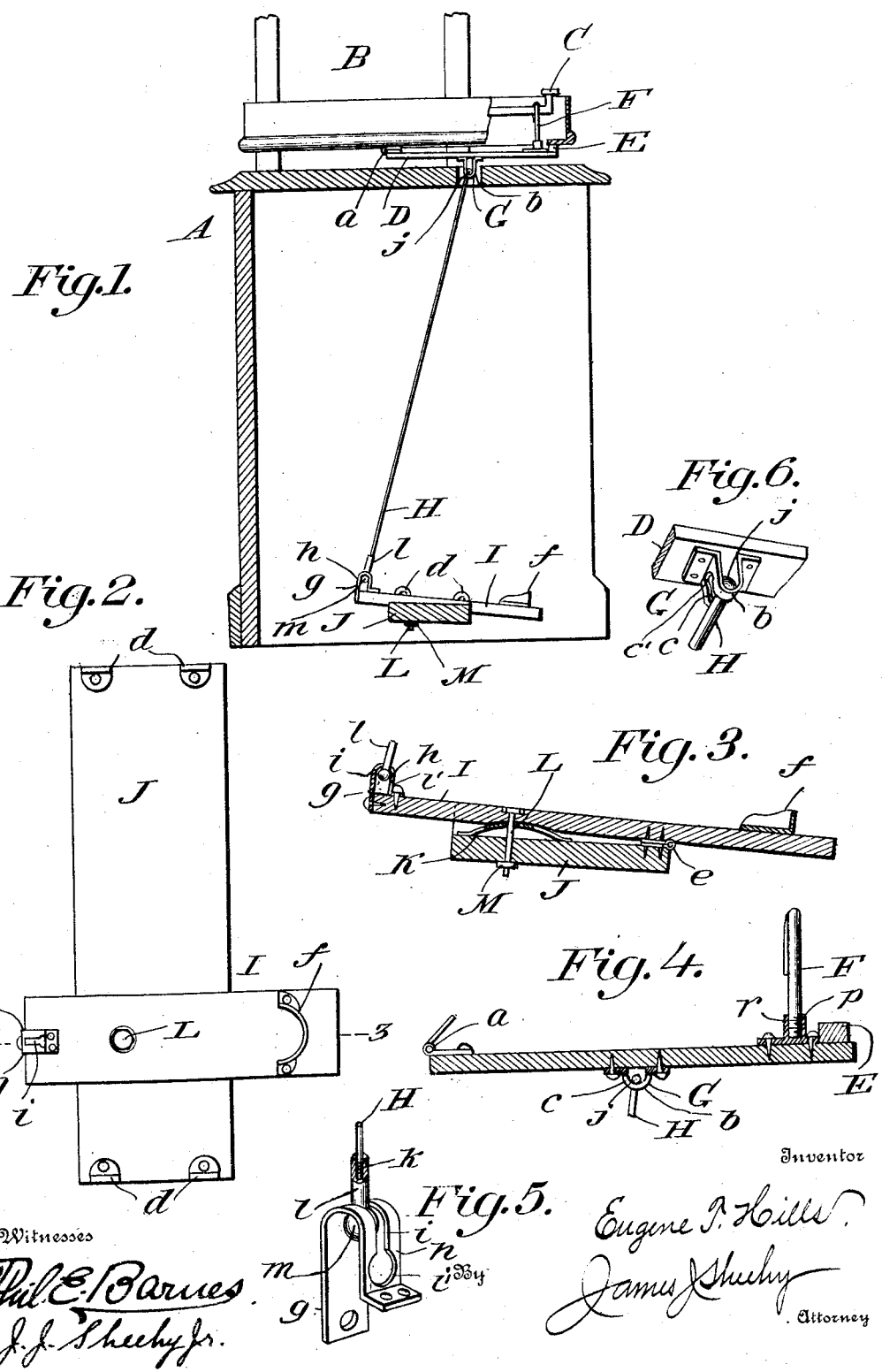

EUGENE T. HILLS, OF SALT LAKE CITY, UTAH, ASSIGNOR OF ONE-HALF TO P. C. HOSMER, OF SALT LAKE CITY, UTAH.

TYPE-WRITING-MACHINE ATTACHMENT.

No. 880,077. Specification of Letters Patent. Patented Feb. 25, 1908.

Application filed October 11, 1907. Serial No. 396,994.

*To all whom it may concern:*

Be it known that I, EUGENE T. HILLS, citizen of the United States, residing at Salt Lake City, in the county of Salt Lake and State of Utah, have invented new and useful Improvements in Type-Writing-Machine Attachments, of which the following is a specification.

My invention pertains to typewriting machines; and it contemplates the provision of a simple and inexpensive attachment through the medium of which the segment of a typewriting machine may be shifted by the foot of the operator, thus enabling the operator to use both hands at all times in actual writing, and one which is readily applicable to machines such as at present in use without entailing change in the construction thereof, and which is noiseless and reliable in operation.

With the foregoing in mind the invention will be fully understood from the following description and claim when the same are read in connection with the drawings, accompanying and forming part of this specification, in which:

Figure 1 is a view illustrating my improvements as properly attached to a typewriting machine. Fig. 2 is an enlarged detail plan illustrating the pedal lever of my improvements, and the support therefor. Fig. 3 is a vertical section taken in the plane indicated by the line 3—3 of Fig. 2. Fig. 4 is an enlarged detail section illustrating the upper lever of my improvements and the appurtenances thereof. Fig. 5 is an enlarged detail perspective, partly in section, illustrating the connection intermediate the pedal lever and the connecting rod of the improvements, and:
Fig. 6 is a similar view illustrative of the connection between the upper lever and the connecting rod.

Similar letters designate corresponding parts in all of the views of the drawings, referring to which:

A is a typewriter stand which may be of any construction compatible with the purpose of my invention, and B is so much of a typewriting machine as is necessary to illustrate the application of my attachment; the said machine being provided with a shift key C of the ordinary or any approved construction.

Connected at *a* in a hinged manner to the under side of the frame of the machine B or to any other suitable support is the upper lever D of my novel attachment. As shown, the said lever is arranged to swing vertically, and is equipped with a bumper pad E, a hook F and a socket G. The bumper pad E is arranged to bring up against the part to which the lever is connected with a view of preventing noise on the upward movement of the lever, and the hook F reaches upward from the lever and is arranged over the shift key C after the manner illustrated in Fig. 1, so as to assure the shift key C accompanying the lever D in the downward movement of the latter. The socket G is carried at the under side of the lever and is provided as best shown in Fig. 6 with a depending loop-shaped portion *b* and an opening *c* in said loop-shaped portion; the said opening *c* having an enlargement *c'* for a purpose presently set forth. In addition to the upper lever D, my novel attachment comprises a connecting rod H, a pedal lever I, and a supporting bar J for the latter. The supporting bar J is preferably provided at its ends with apertured lugs *d* to adapt it for convenient attachment to the sides of the stand A, and in the preferred embodiment of the invention said supporting bar is preferably canted or inclined to a slight extent in the direction of its width. The pedal lever I is pivotally connected to one corner of the supporting bar J, preferably through the medium of a hinge *e*, Fig. 3, and said pedal lever is provided, by preference, with a heel rest *f*, and is also provided with a socket *g*, the latter being preferably located at the forward end of the lever and having a loop-shaped portion *h* and an opening *i* therein; said opening *i* being provided with an enlarged portion *i'*.

Between the supporting bar J and the pedal lever I is interposed a bowed spring K for cushioning the downward movement of the pedal lever and for returning said pedal lever to its normal raised position shown in Fig. 3, and said spring K is preferably, though not necessarily, retained in position by a bolt L which extends through the pedal lever, the spring, and the supporting bar, and is provided with a head countersunk in the upper side of the lever and with a bumper pad M' disposed below the supporting bar. The said bolt is arranged to move with the pedal lever, and the bumper pad M secured thereon is designed to limit the upward movement of the pedal lever, and at the same time eliminate noise incident to such upward movement. The connecting rod H is provided at its upper end with a head $j$, preferably a round head, disposed in the socket G of the upper lever D, and also has its lower end threaded at $k$ and screwed into an end piece $l$ which in turn is provided with a head $m$, preferably a round head, disposed in the socket $g$ of the pedal lever I. By virtue of this construction it will be apparent that when it is desired to disconnect the connecting rod H from the pedal lever I and the upper lever D, the same may be readily accomplished by pressing down the lever D. This will diminish the distance between the lever D and the lever I sufficiently to enable the upper head $j$ to reach the enlarged portion $c'$ of the opening in the upper socket G, when said head may be removed through said enlarged portion $c'$ of the opening. Then by lowering the connecting rod, the head $m$ may be removed through the enlarged portion $i'$ of the opening $i$ in socket $g$.

In the practical use of my novel attachment it will be apparent that when the operator presses with her foot on the lever I said lever will be depressed, and through the medium of the connecting rod H, the upper lever D and the hook F will effect a simultaneous lowering of the shift key C. Upon the lever I being relieved of pressure, the spring K will promptly raise said lever to its normal position, and the shift key in rising will raise the lever D to and hold it in its normal position. At this point attention is called to the fact that by reason of the hook F being employed, the shift key C may, when for any reason it is desirable, be depressed by hand without the necessity of the operator moving the parts of my attachment; also, that the said hook F is advantageous since it effects connection of my attachment to the shift key without entailing puncturing of the latter.

As will be readily gathered from the foregoing, my improved attachment is simple and inexpensive in construction, is susceptible of being readily attached to different types of typewriting machines without the necessity of employing skilled labor, and is reliable in operation and adapted to work so easily as to lessen the labor of the typewriter operator.

For convenience in arranging the hook F relative to the shift key C, said hook is preferably threaded at $p$ and secured in a threaded socket $r$ on the upper lever D, as best shown in Fig. 4.

The construction herein shown and described constitutes the best means known to me for carrying my invention into effect, but it is obvious that in the future practice of the invention such changes or modifications may be made as fairly fall within the scope of my invention as defined in the claim appended.

I am well aware that it is old in garment supporters to employ spaced plates one of which is formed with a keyhole-slot, in combination with a suspender tab having an enlarged end for coöperation with the walls of the slot, and I therefore make no claim to such subject matter.

What I claim and desire to secure by Letters-Patent, is:

In a typewriter attachment, the combination with a pedal lever, a socket piece disposed on the upper side of the forward portion of the pedal lever and having an upwardly extending loop-shaped portion in which is an oblong opening terminating at its lower end in an enlarged opening, a lever disposed above the pedal lever and equipped with means for actuating the shifting means of a typewriting machine, a socket piece disposed at the under side of the upper lever and having a depending loop-shaped portion in which is an oblong opening terminating at its upper end in an enlarged opening, and a spring for cushioning the pedal lever and raising said lever when the same is relieved of pressure; of a connecting rod extending through the oblong openings of the socket-pieces and having heads arranged in the loop-shaped portions of said pieces and also arranged to be withdrawn through the enlarged openings communicating with said oblong openings.

In testimony whereof I have hereunto set my hand in presence of two subscribing witnesses.

EUGENE T. HILLS.

Witnesses:
 LEWIS S. HILLS,
 H. S. YOUNG.